United States Patent Office.

HENRI AUGUSTE LACROIX AND ALFRED CARLES DE CAUDEMBERG, OF NICE, FRANCE.

PROCESS OF PRESERVING MEATS, &c.

SPECIFICATION forming part of Letters Patent No. 611,918, dated October 4, 1898.

Application filed April 5, 1898. Serial No. 676,569. (No specimens.)

*To all whom it may concern:*

Be it known that we, HENRI AUGUSTE LACROIX, gentleman, and ALFRED CARLES DE CAUDEMBERG, doctor, of Nice, Alpes Maritimes, in the Republic of France, have invented a certain new and useful Process of Preserving Organic Substances, of which the following is a full, clear, and exact specification.

This invention relates to the preservation of meats, fats, skins, fish, game, eggs, and other organic substances by a vegetable process.

The invention has for its object the preservation for a more or less indefinite period of organic bodies, compounds, or other substances, such as meats, fish, game, and the like, without lessening their nutritive property and without altering their comestible quality. It is based on the fact, discovered by us, that most plants contain, to a greater or less extent, a special principle which imparts to organic tissues or organic compounds the property or quality of resisting all agents or germs of decomposition. This principle is inherent in plants—the green portion—and common to all in the same degree, as cellulose and chlorophyl, but is, however, independent of every essential or aromatic quality. These antiseptic properties of the essences and aromatics have long been known and have formed the basis of several preserving processes. We, on the contrary, make use, preferably, of plants which contain no aromatic essence, and hay, which gives the best results for our process, is precisely that which is in bacteriology considered or regarded as the best suited to furnish culture-broths. We are therefore compelled to admit that our preserving principle is not antiseptic, and, on the contrary, to attribute the preserving properties thereof to the evolution in the mashing of the vegetable substances, of which operation our process consists, of one or more bacterial species so common in plants, (*Bacillus subtilis*,) which evolution would transform the bath into which the organic substances are plunged, and consequently the substances themselves, into a mixture unsuited to any other fermentation.

*Practical description of the process.*—As we have already said, most plants can in theory be used for this preserving process, but in practice a large number of them must be rejected, some being insufficiently powerful, others containing essential or resinous oils which would alter or modify the taste of the products, and others also, since they contain medicinal or even harmful properties.

After numerous experiments we have been able to ascertain that the plant giving the best result is ordinary hay in a dry state.

The simplest method of making the solution of the active principle is by soaking or mashing in cold water. By "cold water" we mean water at an ordinary temperature. The proportions are about three kilograms of the plant to one hundred liters of water.

The method of proceeding somewhat varies according as it is wished to treat meats or skins and fats—that is to say, subproducts.

*Method of procedure for meats.*—It is sufficient to immerse the substances to be preserved in the bath prepared as above described, care being taken to add to it a small proportion or quantity of niter varying from four to five per cent. of the water employed, and also that the substances to be preserved are completely immersed in the bath. Niter possesses the property of preserving to and in the tissues their natural color and their firmness. The length of the bath varies from nine to ten hours. The temperature of the bath should remain or be kept constant. When taken out of the bath, the substances or pieces are dried. By drying we mean drying of the superficial layer. The underneath portions remain in the fresh state. Drying in a current of air may, generally speaking, be employed. However, such drying is subject to or is influenced by the temperature and the hygrometric state of the atmosphere, and we find advantage as regards invariable results in performing the operation of drying in closed places ventilated by dry air at any temperature between 0° and 50° centigrade, provided that it be kept as constant as possible. The duration of the drying process, which varies in the open air or in a current of air from ten to fifteen days, can be reduced to forty-eight hours by means of ventilated drying-rooms. When the drying is finished, the preservation of the meats is for an indefinite period. Their comestible qualities remain unchanged and they never alter. However, the thickness of the dried superficial casing tends to increase. The reduction in weight is about one-third, due to evaporation of the mother-water or natural water. To cause the substances so treated to return to the fresh state, it is sufficient to restore to them their mother-water by placing them in cold water for about nine hours, and they then regain nearly their original weight.

Animals intended to be slaughtered should not be jaded or in an unfit condition, and it is necessary to avoid inflation of the carcass for the removal of the skin.

*Mode of procedure for subproducts, such as skins and fats.*—For skins and fats the operation is even simpler. We proceed as in the case of meats, but with this difference: that we only use a smaller quantity of niter—that is to say, two and one-half per cent. of the water employed. The drying is more rapid and easier in the open air or a current of air. It occupies scarcely five days and needs no precaution. To restore them to their fresh state for tanning (skins) and for melting, (fats,) we proceed as for meats.

In addition to the articles indicated above our process, being applicable to the preservation of all organic substances, can be used for the preservation of corpses, anatomical parts, &c.

What we claim as our invention, and desire to secure by Letters Patent, is—

A process of preserving organic substances, consisting in subjecting them to the action of a bath formed by mashing hay in cold water, substantially as described.

In testimony whereof we have signed our names to this specification in the presence of two subscribing witnesses.

HENRI AUGUSTE LACROIX.
ALFRED CARLES DE CAUDEMBERG.

Witnesses:
L. DE ZURICH (LOUIS),
EMIL CADISANDY DE MONTGLEUVE.